United States Patent
Berger et al.

(10) Patent No.: US 11,952,940 B2
(45) Date of Patent: Apr. 9, 2024

(54) GAS TURBINE WATER INJECTION FOR EMISSIONS REDUCTION

(71) Applicant: SIEMENS ENERGY GLOBAL GMBH & CO. KG, Munich (DE)

(72) Inventors: Tyler Berger, Johnstown, OH (US); Jaskirat Singh, Chuluota, FL (US)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/609,101

(22) PCT Filed: Mar. 17, 2020

(86) PCT No.: PCT/US2020/023081
§ 371 (c)(1),
(2) Date: Nov. 5, 2021

(87) PCT Pub. No.: WO2020/242556
PCT Pub. Date: Dec. 30, 2020

(65) Prior Publication Data
US 2022/0213837 A1   Jul. 7, 2022

Related U.S. Application Data

(60) Provisional application No. 62/854,636, filed on May 30, 2019.

(51) Int. Cl.
*F02C 3/30* (2006.01)
*F02C 7/22* (2006.01)
(Continued)

(52) U.S. Cl.
CPC ................ *F02C 3/30* (2013.01); *F02C 9/263* (2013.01); *F02C 9/40* (2013.01); *F02C 7/22* (2013.01); *F02C 9/28* (2013.01)

(58) Field of Classification Search
CPC .... F02C 3/30; F02C 3/305; F02C 9/26; F02C 9/263; F02C 9/28; F02C 9/30; F02C 9/32;
(Continued)

(56) References Cited

U.S. PATENT DOCUMENTS 3,032,987 A * 5/1962 Taylor ........................ F02C 9/16
60/39.091
4,073,596 A * 2/1978 Erickson ............... F04D 29/049
415/89
(Continued)

FOREIGN PATENT DOCUMENTS

CN    103062803 A    4/2013
CN    104040149 A    9/2014
(Continued)

OTHER PUBLICATIONS

PCT International Search Report and Written Opinion dated Jun. 17, 2020 corresponding to PCT Application No. PCT/US2020/023081 filed Mar. 17, 2020.
(Continued)

*Primary Examiner* — William H Rodriguez

(57) ABSTRACT

A water delivery system (18) for delivering water for injection into gas turbine engine combustor (4) includes a centrifugal pump (19) and a metering valve (23). The centrifugal pump (19) has an inlet (20) connected to a water source and a discharge (21) connected to a water supply line (22). The metering valve (23) is connected to the water supply line (22) downstream of the discharge (21) of the centrifugal pump (19). The water supply line (22) is connected to an injector nozzle (14) downstream of the metering valve (23). The metering valve (23) is operable to regulate
(Continued)

a flow rate of water in the water supply line (22), to thereby meter an amount of water supplied to the injector nozzle (14).

2 Claims, 2 Drawing Sheets

(51) Int. Cl.
*F02C 9/26* (2006.01)
*F02C 9/28* (2006.01)
*F02C 9/40* (2006.01)

(58) Field of Classification Search
CPC ...... F02C 9/40; F02C 9/48; F02C 7/22; F02C 7/222; F02C 7/228; F02C 7/232; F02C 7/236
See application file for complete search history.

(56) References Cited

U.S. PATENT DOCUMENTS

| | | | |
|---|---|---|---|
| 4,110,973 A | 9/1978 | Haeflich et al. | |
| 4,679,980 A * | 7/1987 | Bland | F04D 1/12 415/24 |
| 4,733,527 A | 3/1988 | Kidd | |
| 5,098,255 A * | 3/1992 | Weber | F04D 1/12 415/88 |
| 5,145,314 A | 9/1992 | Westhoff, Jr. et al. | |
| 5,175,994 A * | 1/1993 | Fox | F23K 5/005 60/39.59 |
| 5,211,530 A * | 5/1993 | Shiffler | F04D 15/0038 29/889.22 |
| 5,344,306 A * | 9/1994 | Brown | C10L 1/328 431/4 |
| 6,145,294 A * | 11/2000 | Traver | F02C 7/232 60/776 |
| 6,209,310 B1 * | 4/2001 | Kuenzi | F02C 7/228 60/39.3 |
| 6,256,975 B1 * | 7/2001 | Dobbeling | B64D 37/32 60/776 |
| 6,434,945 B1 | 8/2002 | Mandai et al. | |
| 6,715,295 B2 * | 4/2004 | Gadde | F02C 3/30 60/39.55 |
| 10,041,417 B2 * | 8/2018 | Horikawa | F23C 99/008 |
| 2001/0004827 A1 | 6/2001 | Vandervort et al. | |
| 2005/0034463 A1 | 2/2005 | Simpson et al. | |
| 2007/0089425 A1 | 4/2007 | Motter et al. | |
| 2008/0098746 A1 * | 5/2008 | Iasillo | F02C 3/22 60/776 |
| 2010/0058770 A1 * | 3/2010 | Ryan | F23N 1/002 60/776 |
| 2010/0186366 A1 * | 7/2010 | Doyle | F02C 3/305 60/39.53 |
| 2011/0314831 A1 * | 12/2011 | Abou-Jaoude | F23R 3/28 60/734 |
| 2013/0031907 A1 * | 2/2013 | Woerz | F23R 3/28 239/398 |
| 2013/0097991 A1 * | 4/2013 | Zhang | F23K 5/12 60/39.59 |
| 2013/0098040 A1 * | 4/2013 | Zhang | F02C 3/305 60/734 |
| 2013/0098041 A1 * | 4/2013 | Zhang | F23K 5/005 60/734 |
| 2013/0098056 A1 * | 4/2013 | Zhang | F02C 3/305 60/39.55 |
| 2013/0180250 A1 | 7/2013 | Harada | |
| 2015/0276226 A1 | 10/2015 | Laster et al. | |
| 2016/0061108 A1 * | 3/2016 | Singh | F02C 3/22 60/39.465 |
| 2016/0305276 A1 | 10/2016 | Meisl et al. | |
| 2017/0138268 A1 * | 5/2017 | Nakahara | F23R 3/36 |
| 2017/0218790 A1 * | 8/2017 | Zhang | F01D 21/003 |
| 2018/0112880 A1 * | 4/2018 | Saha | F02C 3/30 |
| 2018/0363556 A1 * | 12/2018 | Kim | F02C 7/232 |
| 2022/0195929 A1 * | 6/2022 | Aguilar | F02C 7/2365 |

FOREIGN PATENT DOCUMENTS

| | | |
|---|---|---|
| CN | 106062315 A | 10/2016 |
| CN | 106461220 A | 2/2017 |
| EP | 2623740 A2 | 8/2013 |
| JP | 2009185697 A | 8/2009 |
| JP | 2015059695 A | 3/2015 |

OTHER PUBLICATIONS

Yang Cheng et. al / Study on DeNOx Combustion of Gas Turbine by Natural Gas Premixed With Steam, vol. 38 No. 4, Chin.Soc. for Elec. Eng. , DOI 10.13334/j.0258-8013.pcsee.170420 / Feb. 20, 2018.

Luo Fuqiang et al / Simulation Study on Characteristics of NOx Emission in DI Diesel Engine, pp. 33-36 / Mar. 30, 2004.

* cited by examiner

GAS TURBINE WATER INJECTION FOR EMISSIONS REDUCTION

BACKGROUND

1. Field

The present disclosure relates to the field of gas turbine engines, and in particular, to a system and method for water injection into a combustion section of a gas turbine engine for reduction of emissions.

2. Description of the Related Art

As technology continues to improve, more requirements are imposed by government and environmental agencies on products being created. In the context of gas turbine engines, with improvements to combustion technologies, the limits to the overall emissions produced by the engines may be reduced further and further. Combustion byproducts that are currently regulated include nitrogen oxides ($NO_x$), among others. Reducing $NO_x$ emissions is often a requirement in the overall engine design.

There are several known ways for reducing emissions from gas turbine engines. For example, $NO_x$ may be removed from the gas turbine exhaust using a selective catalytic reduction system. Another approach may include preventing or minimizing $NO_x$ from being produced during the combustion process using specific combustor designs and/or techniques such as cooling the air in the combustion process or injecting water with the fuel, both resulting in a lower overall flame temperature.

SUMMARY

Briefly, aspects of the present disclosure are directed to an improved system and method for water injection in a combustion section of a gas turbine engine for reduction of emissions.

According to a first aspect, a water delivery system is provided for delivering water for injection into a combustor of a gas turbine engine. The water delivery system comprises a centrifugal pump having an inlet connected to a water source and a discharge delivering pressurized water to a water supply line. The water delivery system further comprises a metering valve connected to the water supply line downstream of the discharge of the centrifugal pump. The water supply line is connected to an injector nozzle downstream of the metering valve. The metering valve is operable to regulate a flow rate of water in the water supply line, to thereby meter an amount of water supplied to the injector nozzle for injection into the combustor.

According to a second aspect, a combustion system for a gas turbine engine is provided. The combustion system comprises a fuel supply line for supplying a fuel from a fuel source to one or more fuel injector nozzles for injection into a combustor of the gas turbine engine. The combustion system further comprises a water delivery system as described above for delivering metered water for injection into the combustor. The combustion system also includes a control unit operatively coupled to the metering valve of the water delivery system for regulating a flow rate of water injected into the combustor as a function of an amount of fuel supplied to the one or more fuel injector nozzles.

According to a third aspect, a method is provided for delivering water for injection into a combustor of a gas turbine engine. The method comprises operating a centrifugal pump having an inlet connected to a water source and a discharge delivering pressurized water to a water supply line. A metering valve is connected to the water supply line downstream of the discharge of the centrifugal pump. The water supply line is connected to an injector nozzle downstream of the metering valve. The method further comprises controlling the metering valve to regulate a flow rate of water in the water supply line, to thereby meter an amount of water supplied to the injector nozzle for injection into the combustor.

According to a fourth aspect, a computer implemented method is provided for controlling an amount of water injected into a combustor of a gas turbine engine for reduction of emissions produced by the gas turbine engine. The method involves determining a change in engine operating state and adjusting a fuel demand of the combustor responsive to the change in engine operating state. The method further comprises dynamically determining a flow rate of water to be injected into the combustor responsive to the change in engine operating state and the adjustment of the fuel demand. The method further comprises generating a control signal to actuate a metering valve of a water delivery system to achieve the determined flow rate of water injected into the combustor. The water delivery system comprises a centrifugal pump and said metering valve connected to a discharge of the centrifugal pump for delivering metered pressurized water to an injector nozzle.

BRIEF DESCRIPTION OF THE DRAWINGS

The invention is shown in more detail by help of figures. The figures show preferred configurations and do not limit the scope of the invention.

DETAILED DESCRIPTION

In the following detailed description of the preferred embodiments, reference is made to the accompanying drawings that form a part hereof, and in which is shown by way of illustration, and not by way of limitation, a specific embodiment in which the invention may be practiced. It is to be understood that other embodiments may be utilized and that changes may be made without departing from the spirit and scope of the present invention.

Figure 1:
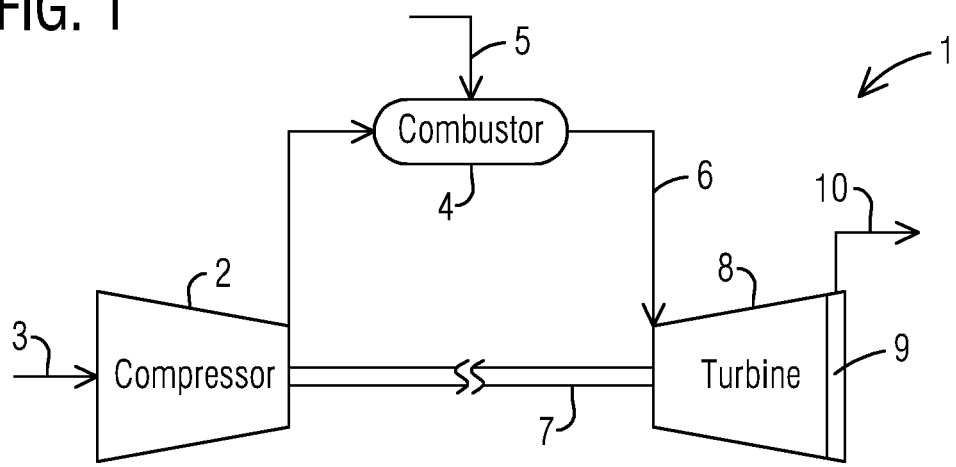
FIG. 1 is a schematic diagram of a gas turbine engine.

Referring to FIG. 1, a gas turbine engine 1 generally includes a compressor section 2, a combustor section 4 and a turbine section 8. In operation, the compressor section 2 inducts an oxidant, typically including ambient air 3, and compresses it. The compressed air from the compressor section 2 enters one or more combustors in the combustor section 4. The compressed air is mixed with the fuel 5, and the air-fuel mixture is burned in the combustors to form a combustion product 6. The combustion product 6 is routed to the turbine section 8 where it is expanded through alternating rows of stationary airfoils and rotating airfoils and used to generate mechanical power that can drive a turbine rotor 7. The turbine rotor 7 may be linked to an electric generator (not shown) and used to generate electricity. The expanded fluid constitutes an exhaust gas 10, which exits the engine via a turbine exhaust section 9.

It is desirable to limit or minimize overall level of emissions in the exhaust gas 10. Aspects of the present disclosure are directed to the objective of reducing the amount of emissions in the exhaust gas 10. In the described embodiments, the objective is achieved by injecting water into the combustor, which results in a lower flame temperature, thereby limiting formation of emissions products such as NOx during the combustion process.

Combustion systems using water injection to lower combustion flame temperature typically employ pressurizing means, such as positive displacement pumps, to deliver high pressure water into the combustor. Such systems typically require multiple pumps and large motors to overcome combustion pressure and to meet the high water-to-fuel ratio that is required to reduce $NO_x$ formation in the combustion process. Furthermore, to maintain emissions levels while ensuring that the engine does not flame out throughout different engine maneuvers, it is desirable that the amount of water injected into the combustor be dynamically adjusted as a function of the amount of fuel supplied to the combustor. In conventional water delivery systems using positive displacement pumps, a change in flow rate of water injected into the combustor is typically achieved by varying the speed of the pumps and/or by operating a larger or smaller number of pumps in response to a change in engine load or power. The present inventors recognize that such systems lack the transient responsiveness to continue engine operation, particularly during sharp changes in engine load or power.

Figure 2:
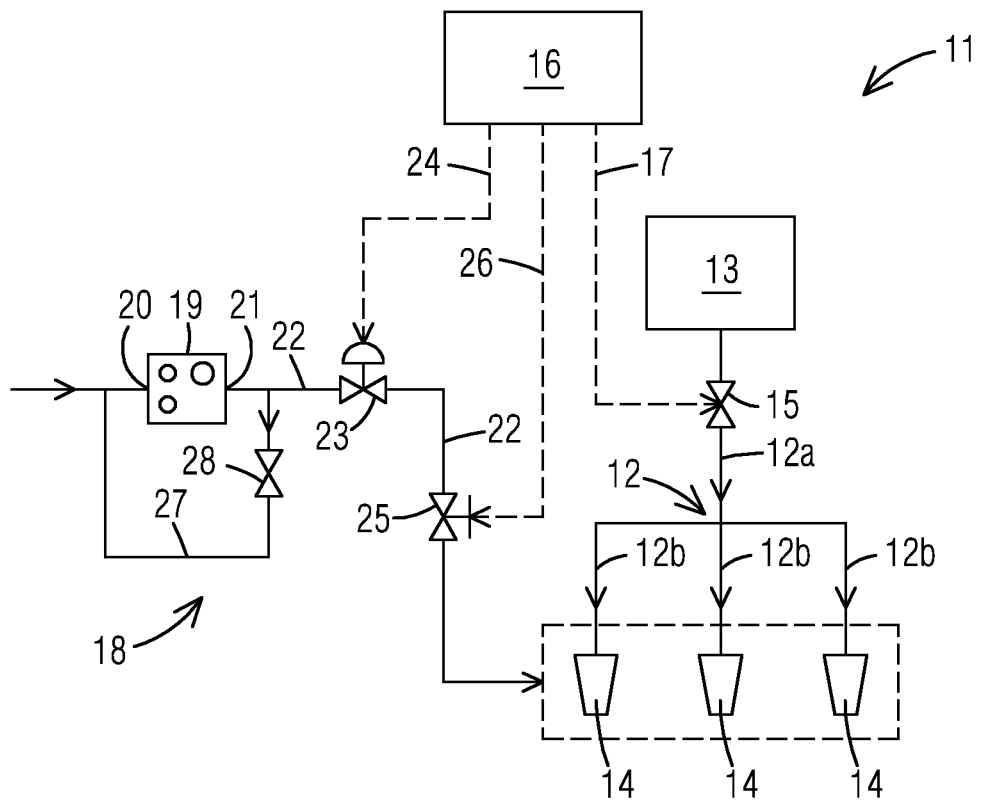
FIG. 2 is a schematic diagram of a portion of a combustion system with water injection according a first example embodiment.

Turning now to FIG. 2, a portion of a combustion system 11 is illustrated, according to a first example embodiment. The combustion system 11 comprises a fuel supply line 12 connected to a fuel source 13, for delivering a fuel to at least one fuel injector 14, typically multiple fuel injectors 14, as illustrated in FIG. 2. Each fuel injector 14 may be configured as a nozzle for discharging a fuel jet into a combustor, where it reacts with compressed air from the compressor section to form a combustion product. To this end, the fuel supply line 12 may be formed of a main line 12a, and a plurality of branch lines 12b associated with each respective injector 14. The fuel flow through the fuel supply line 12 may be regulated via at least one fuel valve 15. In the shown configuration, the fuel valve 15 is arranged on the main line 12a. In other configurations, each branch line 12b may be provided with a respective fuel valve for independently controlling fuel supplied to each fuel injector 14.

The amount of fuel supplied to the fuel injectors 14 may be controlled by a control unit 16, as a function of a fuel demand of the engine. The fuel demand of the engine may be determined by the control unit 16 based on a multiplicity of engine operating parameters, to achieve a desired engine load. The control unit 16 may be operatively coupled to the fuel valve 15 and configured to generate control signals 17 to control the opening of the fuel valve 15, to thereby vary the flow rate of fuel through the fuel supply line 12 based on the calculated fuel demand.

The illustrated combustion system 11 further comprises a water delivery system 18 for delivering water for injection into a combustor of the combustion system 11. The water delivery system 18 comprises a centrifugal pump 19, having an inlet 20 and a discharge 21. The inlet 20 of the centrifugal pump is connected to a water source, for example, a demineralization unit (not shown). The discharge 21 of the centrifugal pump 19 supplies pressurized water to a water supply line 22. A metering valve 23 is connected to the water supply line 22 downstream of the discharge 21 of the centrifugal pump 19. The water supply line 22 is connected to one or more injector nozzles (in this example, the fuel injectors 14) downstream of the metering valve 23 for injecting the water into the combustor. The metering valve 23 is operable to regulate a flow rate of water in the water supply line 12, to thereby meter an amount of water supplied to the injector nozzle 14 for injection into the combustor.

The metering valve 23 may be operatively coupled to the control unit 16, which regulates the flow rate of water injected into the combustor as a function of the amount of fuel supplied to the fuel injectors 14. To this end, the control unit 16 may generate control signals 24 to actuate the metering valve 23 based on a water demand, which may be determined as a function of the operating state and the fuel demand of the engine. The metering valve 23 may comprise, for example, a stem connected to an actuator that receives the control signals 24 from the control unit 16 that instruct the actuator on how far to raise or turn the stem, to influence the flow rate of water. In a non-limiting embodiment, the metering valve 23 may comprise a solenoid air actuated valve. The control signals 24 may be, for example, in the form of electrical voltage.

The embodiments illustrated above thus provide a mechanism of controlling the amount of water injected into the combustor by throttling the flow downstream of the centrifugal pump 19 via a metering valve 23, without requiring a change in rotational speed of the centrifugal pump 19. In one embodiment, the centrifugal pump 19 may therefore be operated at a constant rotational speed throughout during the operation of the metering valve 23 to vary the flow rate of water through the water supply line 22. The metering valve 23 is fast acting, thereby providing significantly improved transient response in comparison to varying pump speed to control the amount of water injected into the combustor. The metering valve 23 may be configured as a modulating valve using feedback control (e.g., utilizing flow sensors, not shown) to precisely control the flow rate of water.

In the present disclosure, the term centrifugal pump is used in a broad sense to encompass a category of pumps that add energy to a fluid by increasing the fluid angular momentum. Centrifugal pumps provide the ability to vary flow rate without changing the rotational speed of the pump. In the illustrated embodiment, the pump 19 is a pitot tube pump. A pitot tube pump is essentially a centrifugal pump in the broadest sense as noted above, but differs from typical centrifugal pumps (also known as "impeller pumps") in that a pitot tube pump uses a rotating casing that imparts centrifugal force to the fluid, and uses a fixed pitot tube located in the rotating casing to capture the discharge flow. The present inventors have recognized that a pitot tube pump provides specific features that make it particularly suitable for the present application. As a first feature, a pitot tube pump is capable of providing a significantly higher discharge pressure than a conventional centrifugal pump having the same speed and size. Furthermore, in contrast to a conventional centrifugal pump, a pitot tube pump has an essentially flat pump curve over a wide operating range, whereby the discharge pressure is substantially constant and independent of the flow rate. The water delivery system 18 employing a pitot tube pump 19 according to the illustrated embodiment may therefore be operated for delivering water at a constant high pressure throughout a wide range of engine maneuvers. Furthermore, a single pitot tube pump may be capable of providing a very high turn-down (for example, a transient shift from 100% to 5% load), which thereby eliminates the need for a large number of pumps and motors. Accordingly, in the illustrated embodiment, only a single pitot tube pump 19 may be used for the entire combustion system of the engine. The illustrated embodiment therefore provides a reduced footprint and improved transient response in relation to conventional delivery systems for water injection.

As an additional safety feature, a shut-off valve 25 may be provided on the water supply line 22. The shut-off valve 25 may be operable, for example via control signals 26 from the control unit 16, to temporarily shut-off flow in the water supply line 22 in the event of an engine load shed. The shut-off may be transient, and water may be reintroduced into the water supply line 22, for example, within seconds, to continually maintain $NO_x$ emissions below required limits. In the illustrated embodiment, the water delivery system 18 further comprises a bleed line 27 connected to the water supply line 22 for feeding back a portion of flow downstream of the pump discharge 21 to the pump inlet 20. A flow valve 28 is arranged on the bleed line 27, which may have a fixed setting, to allow a constant flow rate of water in the bleed line. In particular, the flow valve 28 may be pre-set to allow a constant low flow through the bleed line 27, to ensure that the centrifugal pump does not trip in the event that the water supply line 22 is shut-off via the shut-off valve 25.

In the shown example, the water supply line 22 is connected to the fuel injectors 14 to deliver metered water thereto, whereby the water is premixed with the fuel in the fuel injectors 14 prior to being injected into the combustor. Such a configuration may be particularly applicable to a combustion system utilizing liquid fuel. In alternate embodiments, water and fuel may be injected into the combustor via separate injector nozzles.

Figure 3:
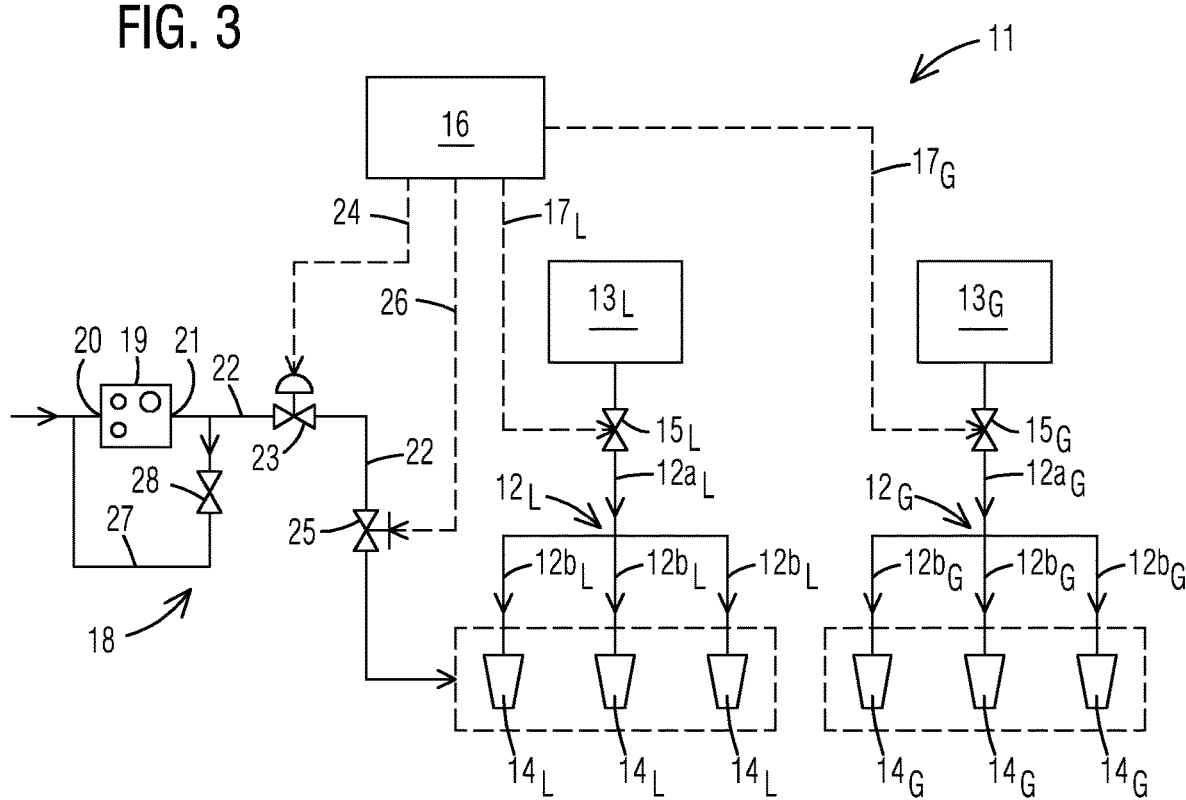
FIG. 3 is a schematic diagram of a portion of a combustion system with water injection according a second example embodiment.

FIG. 3 illustrates a portion of a combustion system 11, according to a second example embodiment. The embodiment of FIG. 3 involves a dual fuel combustion system capable of operating with a liquid fuel and a gas fuel. In FIG. 3, the reference numerals for like elements have been retained from FIG. 2, for the sake of brevity. The fuel distribution elements for the liquid fuel are identified by the letter L in subscript, while the fuel distribution elements for the gas fuel are identified by the letter G in subscript. As shown, the combustion system 11 herein comprises a first fuel supply line $12_L$ for supplying a liquid fuel from a liquid fuel source $13_L$ to one or more (typically multiple) first fuel injectors $14_L$. The combustion system 11 further comprises a second fuel supply line $12_G$ for supplying a gas fuel from a gas fuel source $13_G$ to one or more (typically multiple) second fuel injectors $14_G$. Each of the fuel supply lines $12_L$ and $12_G$ are provided with respective fuel valves $15_L$ and $15_G$. The control unit 16 may be operatively coupled to the fuel valves $15_L$ and $15_G$ for switching between a liquid fuel operating mode and a gas fuel operating mode. Furthermore, the control unit 16 may be configured to control the fuel valves $15_L$ and $15_G$ based on a calculated fuel demand of the engine in a given operating mode.

The illustrated dual fuel combustion system 11 also comprises a water delivery system 18, similar to that illustrated in FIG. 2, the description of which will not be repeated. In the present embodiment, the water supply line 22 of the water delivery system 18 is connected to the first fuel injectors $14_L$. In the liquid fuel operating mode, the second fuel valve $15_G$ is operated to shut-off gas fuel supply to the injectors $14_G$, while the first fuel valve $15_L$ remains open. In this mode, the liquid fuel is premixed with the water in the first fuel injectors $14_L$ prior to injection into the combustor. In the gas fuel operating mode, the first fuel valve $15_L$ is operated to shut-off liquid fuel supply to the injectors $14_L$, while the second fuel valve $15_G$ remains open. In this mode, the water and the gas fuel are separately injected into the combustor via the injectors $14_L$ and $14_G$ respectively.

Figure 4:
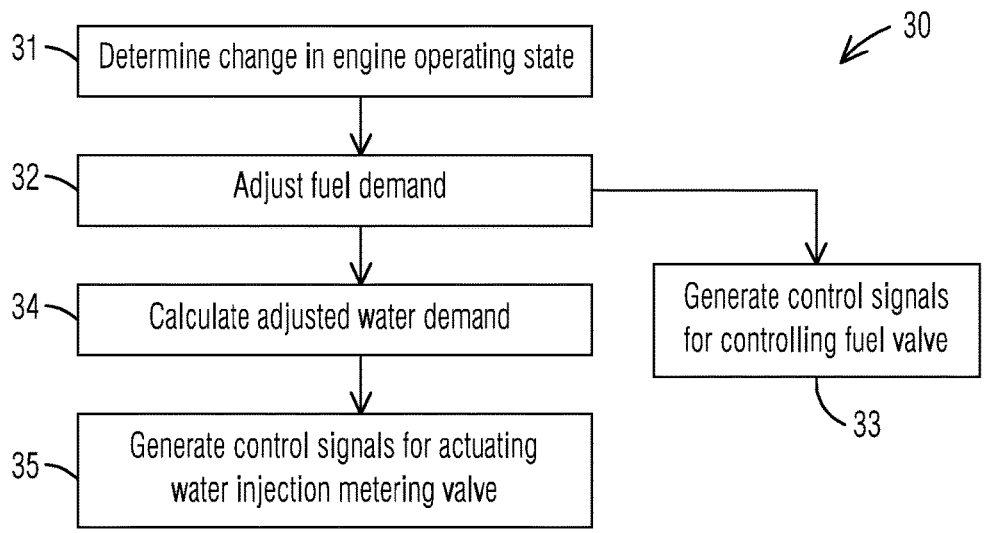
FIG. 4 is a flowchart illustrating an example control method in accordance with an aspect of the present disclosure.

FIG. 4 is a flow chart illustrating an exemplary computer implemented method 30 for controlling an amount of water injected into a combustor of a gas turbine engine for reducing emissions produced by the gas turbine engine. The method 30 may be executed by the control unit of the above described embodiments. To this end, the control unit may comprise a combination of hardware and software including specific algorithms to implement the method 30. At block 31, the method includes determining a change in operating state of the engine. A change in operating state may include, for example, a change in engine power/load and/or shaft speed. At block 32, the method includes adjusting a fuel demand of the combustor responsive to the change in engine operating state. The fuel demand may be determined based on a multiplicity of engine operating parameters, to achieve the desired operating state. Non limiting examples of operating parameters include measured or calculated values of: ambient air temperature, temperature at compressor inlet, temperature at turbine exhaust outlet, temperature at turbine inlet, temperature at combustor inlet, combustion zone temperature, fuel-air ratio, among others. At block 33, the method includes generating a control signal to actuate a fuel valve to regulate an amount of fuel supplied to the fuel injectors. At block 34, the method includes dynamically determining an adjustment in the water demand, which is the flow rate of water to be injected into the combustor responsive to the change in the operating state and the adjustment of the fuel demand. The water demand may be determined, for example, based on look up tables or any other mathematical or analytical tools that define a relationship between the fuel flow rate, the operating state and water flow rate, so as to achieve a defined limit on emission products generated by the combustion process. For example, the water demand may typically be low during engine startup, to prevent flame-out, and high at baseload operation. At block 35, the method includes generating a control signal to actuate a metering valve of a water delivery system to achieve the determined flow rate of water injected into the combustor. The centrifugal pump of the water injection may be operated at a substantially constant rotational speed during the execution of the method.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof

The invention claimed is:

1. A dual fuel combustion system for a gas turbine engine, comprising:
   a liquid fuel supply line for supplying a liquid fuel from a liquid fuel source to one or more liquid fuel injector nozzles for injection into a combustor of the gas turbine engine,
   a gas fuel supply line for supplying a gas fuel from a gas fuel source to one or more gas fuel injector nozzles for injection into the combustor of the gas turbine engine, wherein the liquid fuel supply line and the gas fuel supply line are respectively provided with a liquid fuel valve and a gas fuel valve, a water delivery system connected to deliver metered water to be injected into the combustor, whereby the water is premixed with the fuel in the one or more of fuel injector nozzles, a control unit operatively coupled to the metering valve of the water delivery system for regulating a flow rate of water injected into the combustor as a function of an amount of fuel supplied to the one or more fuel injector nozzles, wherein the control unit is operatively coupled to the liquid and gas fuel valves for switching between a liquid fuel operating mode and a gas fuel operating mode, whereby, in the liquid fuel operating mode, the liquid fuel is premixed with the water in the liquid fuel injector nozzle prior to injection into the combustor, and in the gas fuel operating mode, the water and the gas fuel are separately injected into the combustor via the liquid fuel injector nozzle and the gas fuel injector nozzles respectively.

2. A computer-implemented method for controlling an amount of water injected into a combustor of a gas turbine engine for reducing emissions produced by the gas turbine engine, comprising:

determining a change in engine operating state, adjusting a fuel demand of the combustor responsive to the change in engine operating state, dynamically determining a flow rate of water to be injected into the combustor responsive to the change in engine operating state and the adjustment of the fuel demand, generating a control signal to actuate a metering valve of a water delivery system to achieve the determined flow rate of water injected into the combustor, wherein the water delivery system comprises a centrifugal pump and said metering valve connected to a discharge of the centrifugal pump for delivering metered pressurized water to at least one fuel injector nozzle, and wherein the water is premixed with the fuel in the one or more of the fuel injector nozzles, wherein the combustion system comprises:

a liquid fuel supply line for supplying a liquid fuel from a liquid fuel source to one or more liquid fuel injector nozzles for injection into a combustor of the gas turbine engine, a gas fuel supply line for supplying a gas fuel from a gas fuel source to one or more gas fuel injector nozzles for injection into the combustor of the gas turbine engine, wherein the liquid fuel supply line and the gas fuel supply line are respectively provided with a liquid fuel valve and a gas fuel valve, a water delivery system connected to deliver metered water to be injected into the combustor, whereby the water is premixed with the fuel in the one or more of fuel injector nozzles, a control unit operatively coupled to the metering valve of the water delivery system for regulating a flow rate of water injected into the combustor as a function of an amount of fuel supplied to the one or more fuel injector nozzles, wherein the control unit is operatively coupled to the liquid and gas fuel valves for switching between a liquid fuel operating mode and a gas fuel operating mode, whereby, in the liquid fuel operating mode, the liquid fuel is premixed with the water in the liquid fuel injector nozzle prior to injection into the combustor, and in the gas fuel operating mode, the water and the gas fuel are separately injected into the combustor via the liquid fuel injector nozzle and the gas fuel injector nozzles respectively.

* * * * *